(12) United States Patent
Gerrard

(10) Patent No.: US 7,823,894 B2
(45) Date of Patent: Nov. 2, 2010

(54) INDEPENDENT SUSPENSION FOR A MOTOR VEHICLE

(75) Inventor: Miles Barnaby Gerrard, Turin (IT)

(73) Assignee: Sistemi Sospensioni S.p.A., Corbetta (IT)

( * ) Notice: Subject to any disclaimer, the term of this patent is extended or adjusted under 35 U.S.C. 154(b) by 408 days.

(21) Appl. No.: 11/720,966

(22) PCT Filed: Dec. 6, 2005

(86) PCT No.: PCT/EP2005/056518
§ 371 (c)(1),
(2), (4) Date: Sep. 10, 2007

(87) PCT Pub. No.: WO2006/061383
PCT Pub. Date: Jun. 15, 2006

(65) Prior Publication Data
US 2008/0079233 A1 Apr. 3, 2008

(30) Foreign Application Priority Data
Dec. 9, 2004 (IT) .......................... TO2004A0861

(51) Int. Cl.
*B60G 3/04* (2006.01)
(52) U.S. Cl. ............................................. 280/124.134
(58) Field of Classification Search .......... 280/124.135, 280/124.134, 124.137, 124.143
See application file for complete search history.

(56) References Cited

U.S. PATENT DOCUMENTS 4,462,609 A * 7/1984 von der Ohe ......... 280/124.143
4,753,456 A * 6/1988 Booher ................ 280/124.134
4,968,056 A * 11/1990 Haraguchi ........... 280/124.138
5,080,388 A * 1/1992 Berry et al. ............ 280/86.757

FOREIGN PATENT DOCUMENTS

| EP | 1 288 028 A | 3/2003 |
| EP | 1 361 084 A | 11/2003 |
| EP | 1 527 911 A | 5/2005 |
| JP | 01 190511 A | 7/1989 |
| JP | 02 037008 | 2/1990 |
| JP | 2002 012015 | 1/2002 |

* cited by examiner

*Primary Examiner*—Faye M. Fleming
(74) *Attorney, Agent, or Firm*—Sughrue Mion, PLLC

(57) ABSTRACT

The suspension comprises at least one lower arm (14, 18; 42; 14) connected (24, 34; 24) to the vehicle body and at least one upper link (16; 58; 60, 62; 64; 66; 16, 68) connected (30; 63; 67; 30,71) to the vehicle body (20). The lower arm (14, 18; 42; 14) carries at least two substantially blade-like flexible members (22, 23; 22, 23, 25), which are connected (36, 37; 36, 37, 39) to the wheel carrier of the wheel (12) and the planes of which intersect along one common axis (T1) of predetermined orientation defining a first shear axis of the suspension. The at least one lower arm (14, 18; 42; 14) is configured so as to define a second shear axis (T2) of predetermined orientation acting in series with the first axis (T1), in such a manner that when the wheel carrier is subject to an external force acting in a substantially horizontal plane the displacement of the wheel carrier (12) results from the combination of the rotations of the wheel carrier about the two shear axes (T1, T2).

19 Claims, 8 Drawing Sheets

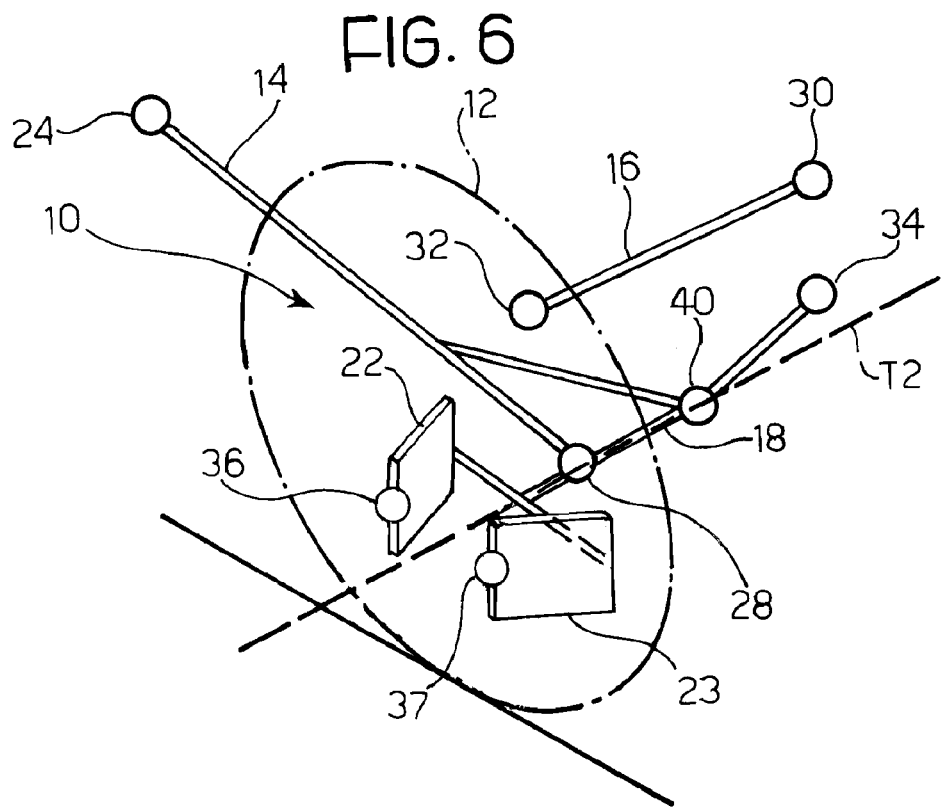
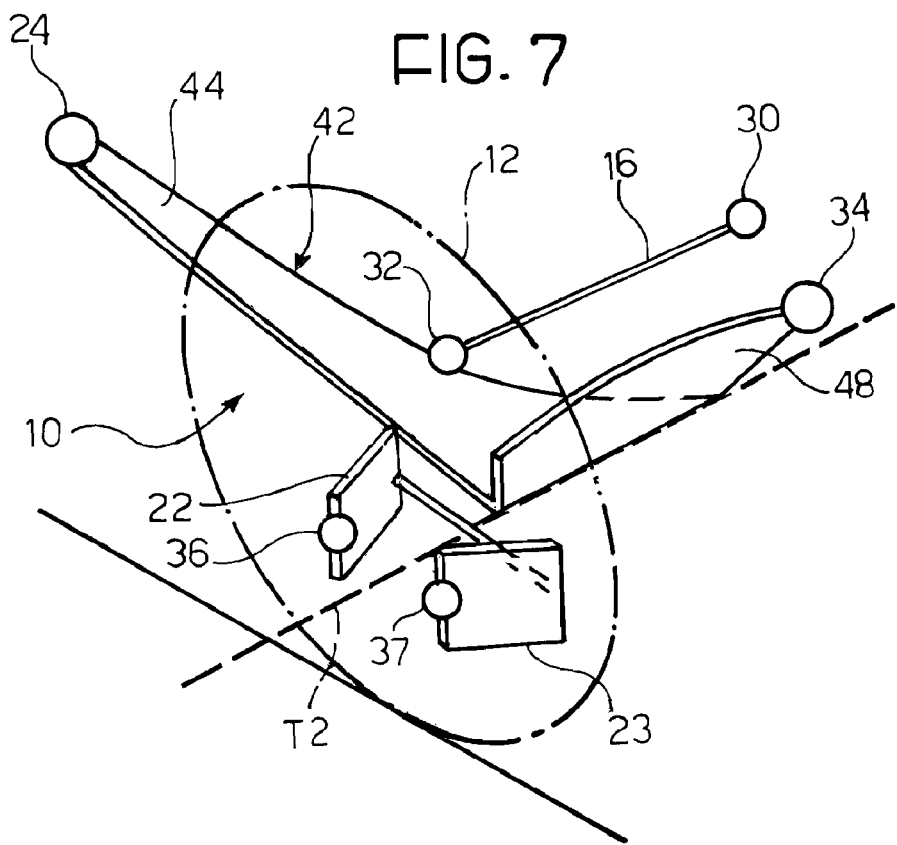

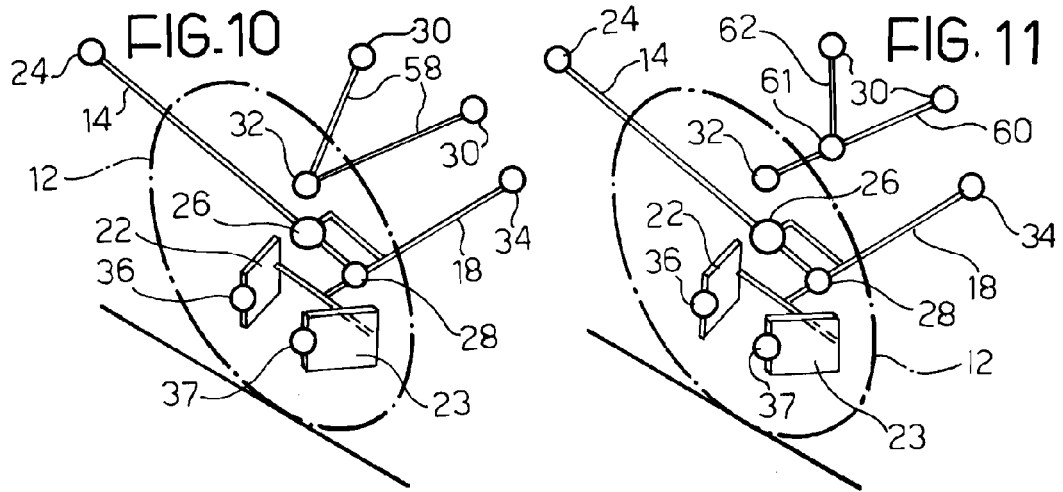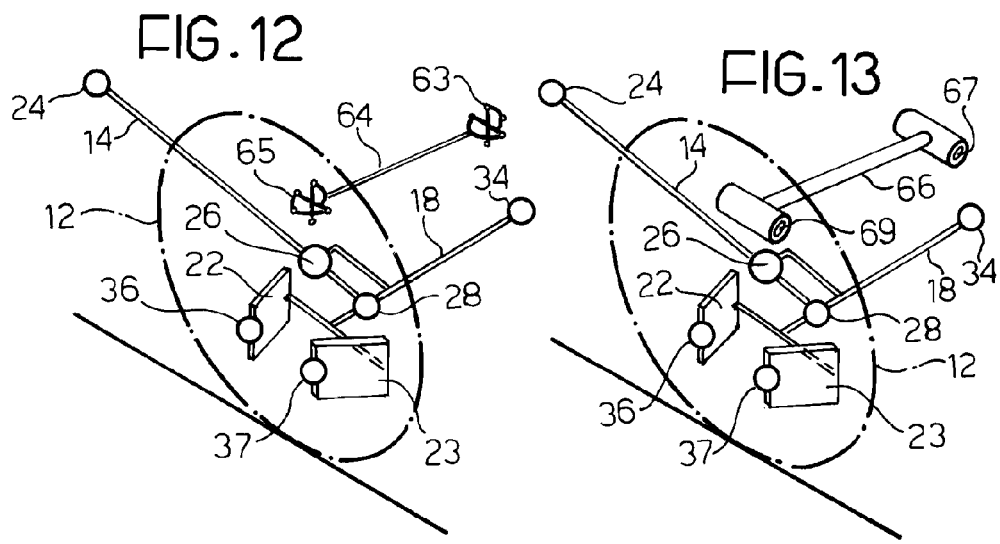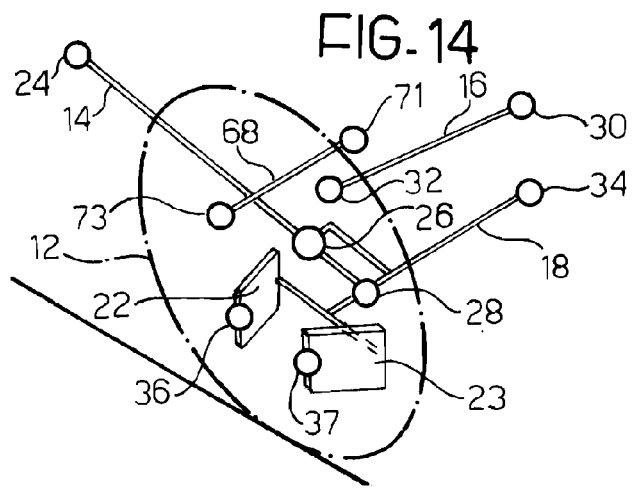

INDEPENDENT SUSPENSION FOR A MOTOR VEHICLE

The present invention relates to an independent suspension for a motor vehicle, of the kind defined in the preamble of claim 1.

A suspension of this kind is known from European Patent Application EP-A-1 288 028 in the name of the Applicant. This known suspension essentially comprises a transverse arm, a transverse rod and a camber control rod, each interposed between a wheel carrier and the vehicle body. Specifically, the transverse arm comprises a pair of blade-like flexible elements, which are articulated at their ends to the wheel carrier and to the vehicle body and are connected to each other by means of a torsionally stiff, longitudinal tubular element. Firstly, the transverse arm controls two kinematics degrees of freedom of rotation about first and second substantially longitudinal axes, defined by the points of articulation to the wheel carrier and to the vehicle structure. Moreover, the flexibility, the configuration and the orientation of the two blades of the transverse arm are chosen in such a manner that the wheel carrier is capable of rotating about a third axis of predetermined orientation (referred to as "shear axis"), as a result of the deformation of the two blades about that axis. The transverse arm is therefore capable of controlling a third rotational degree of freedom of the wheel carrier about the shear axis. This third degree of freedom is defined as a "structural" degree of freedom since, contrary to the other two rotational degrees of freedom, it is not defined by a geometrical constraint but by the inherent flexibility of the components of the arm with respect to the shear axis. In order to achieve the best compromise between the opposite requirements for insulation of the occupants of the vehicle from the unevenness of the road and for effective and prompt response to the forces acting on the wheels, in particular to the steering and braking forces, this third axis is preferably chosen to pass in the vicinity of the contact patch of the tyre.

It is the object of the present invention to provide an independent suspension for a motor vehicle which has a better elasto-kinematic behaviour, which has more compact sizes and which is easier to install on different motor-vehicles models than the prior art.

This and other objects are achieved according to the invention by virtue of an independent suspension for a motor vehicle having the characteristics set forth in independent claim 1.

Further advantageous characteristics of the invention are specified in the dependent Claims.

To summarise, the invention is based on the idea of providing an independent suspension for a motor vehicle which, by virtue of the arrangement and the stiffness characteristics of its components, forms an elastic system having two shear axes of predetermined orientation arranged so as to act in series with one another, one of these axes being defined by a pair of blade-like flexible elements.

Preferably, the two shear axes are disposed in a transverse vertical plane and are orientated perpendicular to each other, wherein the first shear axis is arranged substantially vertically while the second shear axis arranged substantially horizontally, the torsional stiffness of the elastic system less than the one about the first, substantially vertical about the second, substantially horizontal shear axis being shear axis.

The characteristics and the advantages of the present invention will become apparent from the detailed description which follows, given purely by way of non-limiting example with reference to the appended drawings, in which:

FIGS. 6 to 8 are schematic illustrations each showing a variant of embodiment of an independent suspension for a motor vehicle according to the invention which differs from the embodiment of FIG. 1 in the way of realisation of the second shear axis;

FIGS. 10 to 14 are schematic illustrations each showing a variant of embodiment on an independent suspension for a motor vehicle according to the invention which differs from the embodiment of FIG. 1 in the further links than those which define the two shear axes of the suspension;

In the description and the claims which follow, terms such as "longitudinal" and "transverse", "vertical" and "horizontal", "front" and "rear" are to be intended as referred to the mounted condition on the vehicle.

Figure 1:
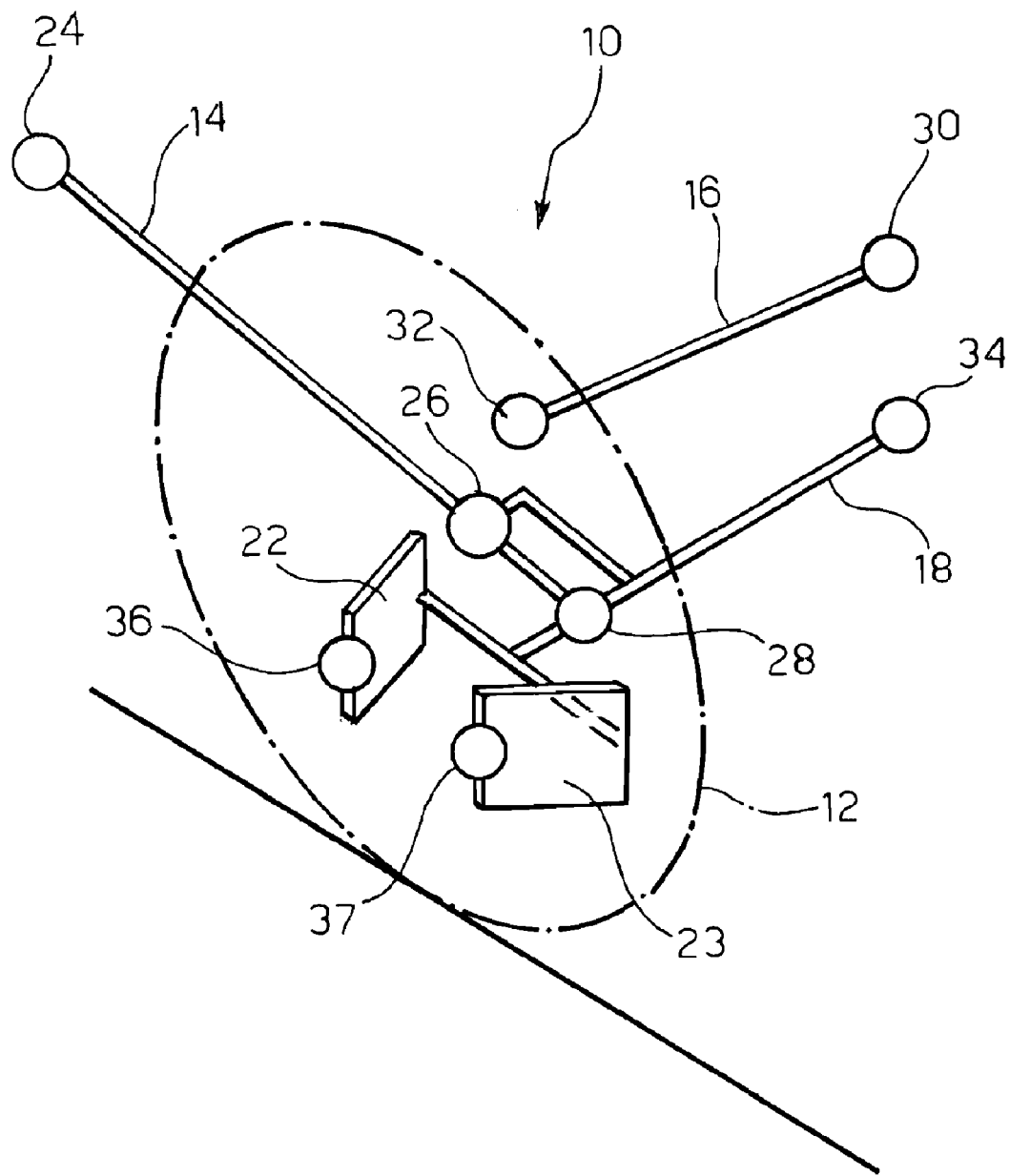
FIG. 1 is a schematic illustration of an independent suspension for a motor vehicle according to a preferred embodiment of the present invention.
Figure 19:
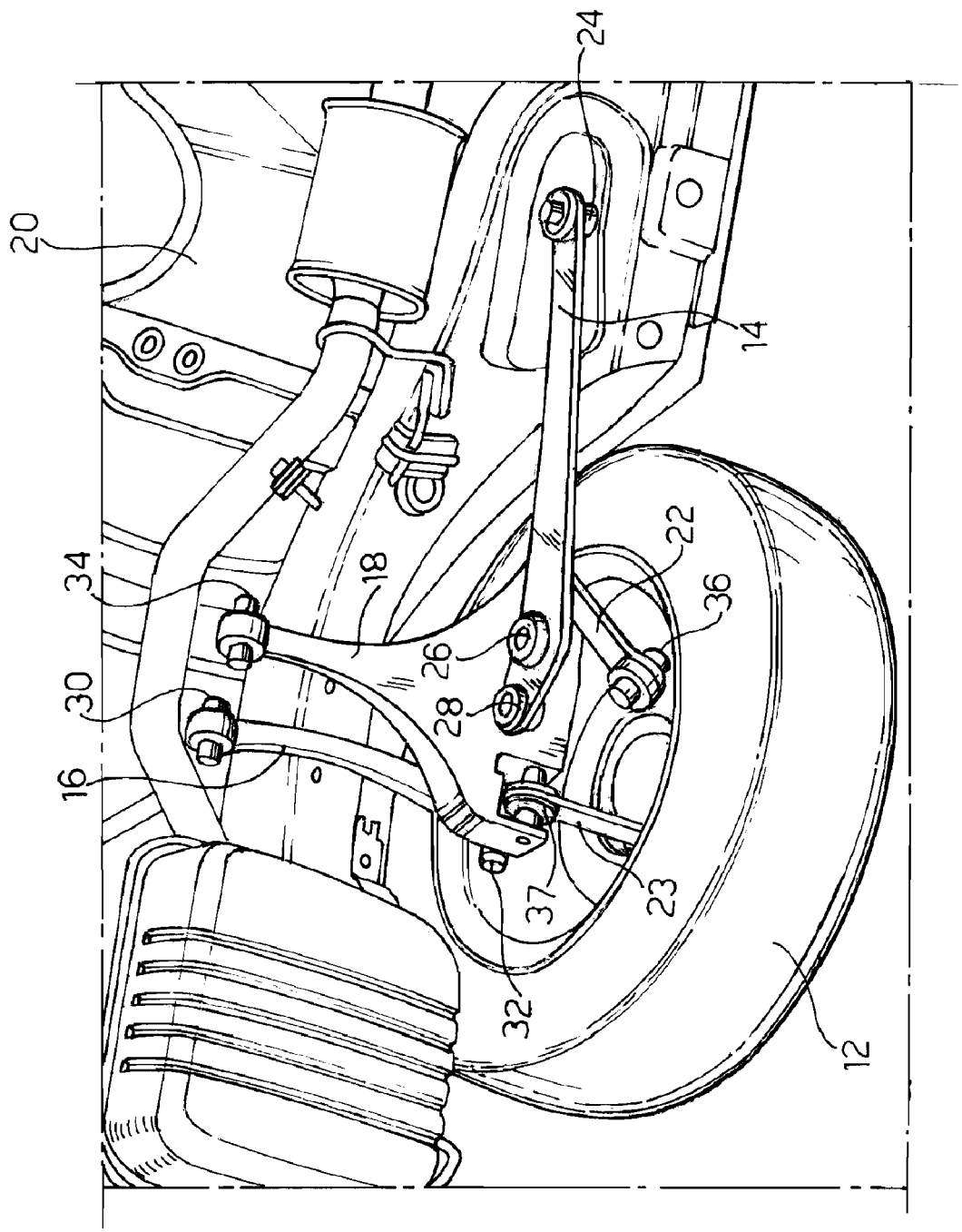
FIG. 19 is a perspective view from below which shows a variant of embodiment of the invention intended for a rear suspension of a motor vehicle.

By referring first to FIGS. 1 and 19, numeral 10 generally indicates an independent suspension for a motor vehicle intended to connect a wheel 12, in this case a rear wheel, which may be either a driving wheel or a non-driving wheel, to the body 20 of the vehicle (partially illustrated in FIG. 19). The suspension 10 basically comprises a longitudinal arm 14, a lateral upper rod 16 (camber control rod) and a transverse lower arm 18, all of which are rigid components, and a pair of blade-like flexible members 22 and 23 which connect the transverse lower arm 18 to a wheel carrier (per-se-known and not illustrated) of the wheel 12.

The longitudinal arm 14 is articulated at its front end to the vehicle body 20 by means of a bush 24 and in its rear portion to the transverse arm 18 by means of a pair of bushes 26 and 28, the first one of which is arranged in an intermediate point of the longitudinal arm 14 while the second one is arranged at the rear end of this arm. The lateral upper rod 16 is articulated at its transversely inner end to the vehicle body 20 by means of a bush 30 and at its transversely outer end to the wheel carrier by means of a bush 32. The transverse lower arm 18 is articulated at the transversely inner end to the vehicle body 20 by means of a bush 34 and is connected at the transversely outer end to the wheel carrier through the two flexible blades 22 and 23. In the embodiment of FIG. 1 the flexible blades 22 and 23 are fixed at their transversely inner ends to the transverse lower arm 18 and are articulated at their transversely inner ends to the wheel carrier by means of respective bushes 36 and 37. In the variant of embodiment of FIG. 19, on the other hand, one of the two flexible blades, in this case the rear blade 23, is articulated at its transversely inner end to the transverse lower arm 18 by means of the bush 37 and is fixed at its transversely outer end to the wheel carrier.

All the above-indicated bushes are rigid, apart from the bush 26 between the longitudinal arm 14 and the transverse lower arm 18 which determines the longitudinal compliance characteristic of the suspension.

The above-illustrated suspension architecture defines an elastic system whose behaviour under load is determined by the arrangement of two shear axes T1 and T2 (FIGS. 2 and 3), wherein the term shear axis refers to the axis about which the elastic system has a very low rotational stiffness with respect to the other two orthogonal directions. A shear axis thus represents the locus of the points of highest translational stiffness with respect to forces acting on the elastic system in a direction perpendicular to the axis, since any other force not passing through this axis causes a rotation which results in a further elastic yielding of the system in the point of application of this force.

In other words, each shear axis can be conceived as an elastic hinge of the assembly of arms and rods which connect the wheel carrier to the vehicle body. This elastic hinge thus defines the axis about which the wheel carrier tends to rotate with respect to the vehicle body when it is subject to an external force. In the present case, the elastic behaviour of the suspension is defined by two shear axes acting in series with one another, in such a manner that when the wheel carrier is subject to an external force perpendicular to these two axes its displacement in due to the combination of the rotations about the two shear axes.

Figure 2:
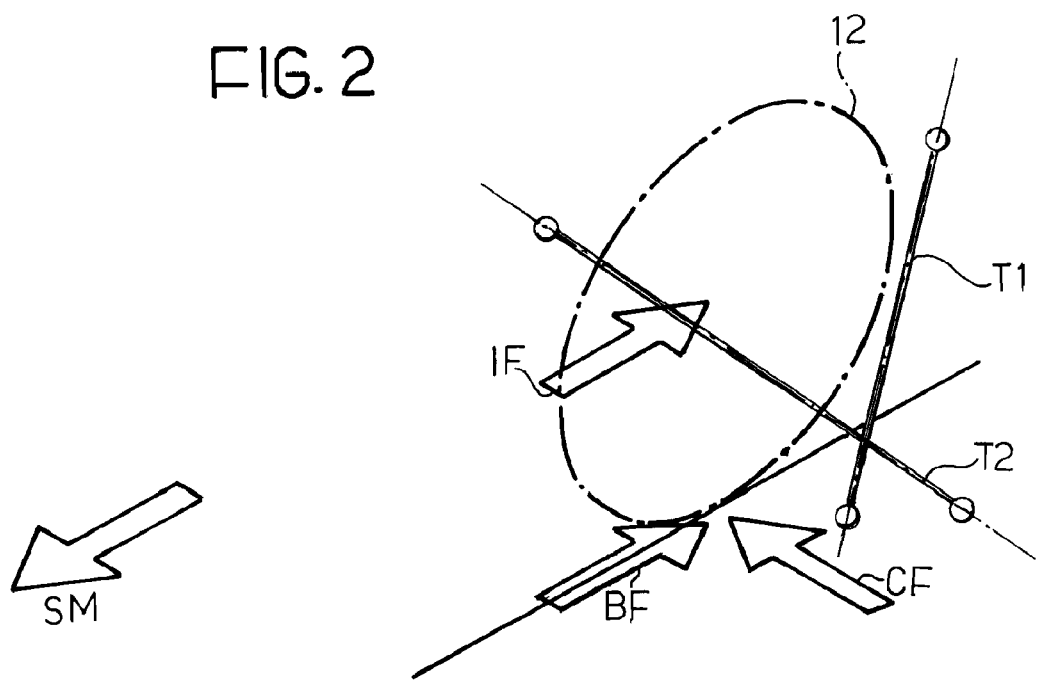
FIGS. 2 and 3 are perspective and front elevation schematic illustrations, respectively, which show the positioning of the two shear axes of the suspension of FIG. 1.
Figure 3:
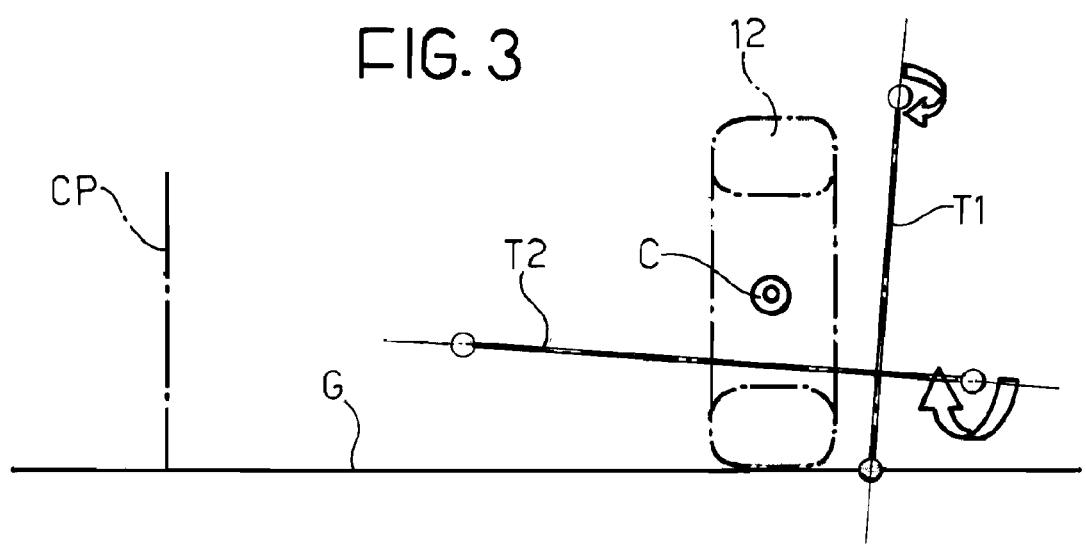

With reference in particular to FIGS. 2 and 3, in the embodiment illustrated herein (which is intended to a rear suspension of a motor vehicle, as mentioned above) the two shear axes T1 and T2 are disposed substantially in a transverse vertical plane. The first shear axis T1 extends substantially vertically outside the vehicle (the longitudinal middle plane of the vehicle is indicated CP), while the second shear axis T2 extends substantially horizontally, at a height comprised between the ground G and the wheel centre C. The horizontal shear axis T2 has a lower torsional stiffness than the one of the vertical shear axis T1. This means that a force which is directed perpendicularly to the plane defined by the two shear axes T1 and T2 and is applied to the wheel carrier in a point equidistant from these axes causes a smaller angular displacement about the axis T1 than the one about the axis T2. However, also in this case the resulting displacement of the wheel carrier will be the sum of these two angular displacements.

The special arrangement of the two shear axes T1 and T2 shown in FIGS. 2 and 3 meets the elasto-kinematic requirements of the suspension in the following way.

Firstly, the second, torsionally less stiff shear axis T2 (horizontal axis) provides the required high longitudinal compliance of the wheel carrier at the wheel centre to ensure good comfort performance of the suspension.

Secondly, the torsional stiffnesses of the two shear axes are properly chosen depending on the distance of the shear axes from the wheel centre, in such a manner that the components about the vertical axis of the rotations about the two shear axes (that is to say, the components which together make up the toe change at the wheel) cancel each other out in case of an impact or traction longitudinal force IF at the wheel centre, but sum in case of a braking longitudinal force BF at the contact patch. In this way, the requirement for high toe-in under braking forces and at the same time for minimal toe change under traction or impact forces can be met.

It is however possible, with a suspension according to the invention, meet other requirements than those indicated above by properly defining from time to time the orientation of the two shear axes.

Thirdly, by virtue of the torsionally stiffer, vertical shear axis T1 being arranged behind the contact patch with respect to the driving direction of the vehicle (indicated SM in FIG. 2), a toe-in effect under steering forces (indicated CF in FIG. 2) is obtained. Since the second shear axis T2 is substantially parallel to the steering forces, its presence does not significantly reduce the available lateral stiffness at the contact patch. Provided that the first shear axis T1 is not placed too far from the contact patch of the wheel (for example at a distance of 80 to 100 mm) and has a torsional stiffness suitable for providing the required toe change under steering forces, then the wheel carrier will exhibit the required high lateral stiffness at the contact patch.

Figure 4:
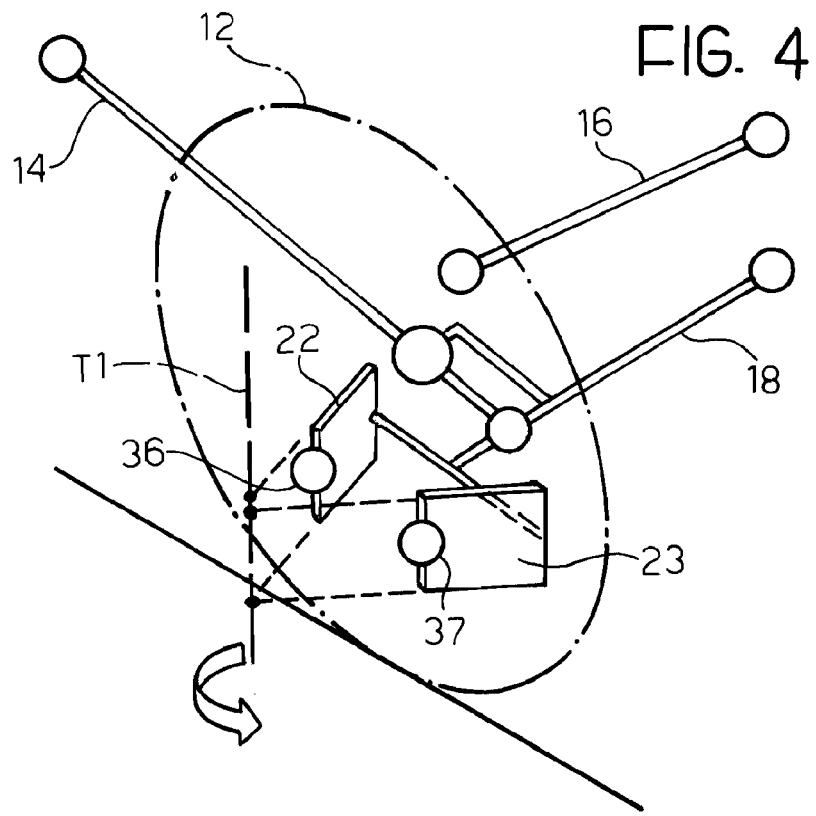
FIG. 4 is a schematic illustration similar to that of FIG. 1, which shows in particular the construction of the first shear axis of the suspension.
Figure 5:
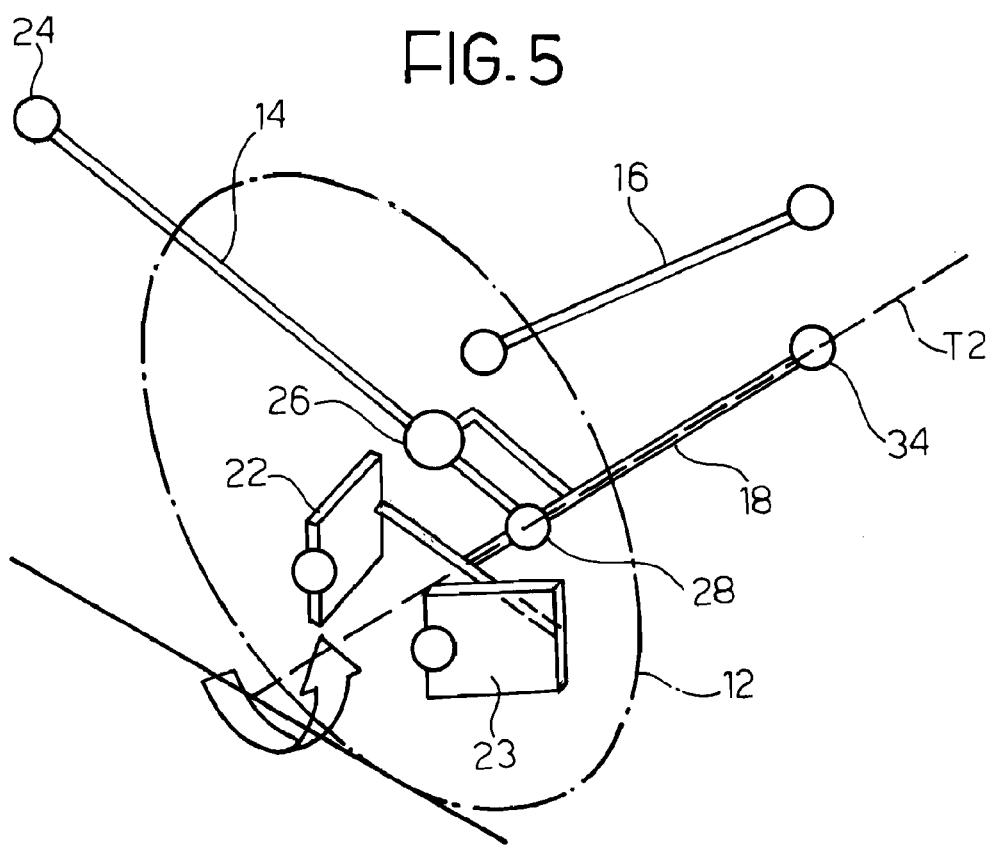
FIG. 5 is a schematic illustration similar to that of FIG. 1, which shows in particular the construction of the second shear axis of the suspension.

FIGS. 4 and 5 illustrate how the suspension architecture described above defines the two shear axes T1 and T2.

The bushes 34 and 28 by means of which the transverse arm 18 is connected to the vehicle body and to the longitudinal arm 14, respectively, are rigid rubber bushes, whereas the bush 26 by means of which the longitudinal arm 14 is connected to the transverse arm 18 is a soft rubber bush. Accordingly, the transverse arm 18 has the possibility to rotate about the axis passing through the two bushes 34 and 28 with very little elastic resistance. This axis therefore defines the second, torsionally less stiff shear axis T2, which is orientated substantially horizontally and transversely. Since the bushes 24, 28 and 34 are all rigid bushes, this shear axis is very stiff for forces passing through the axis, but torsionally very compliant (that is, in case of forces not passing through the axis).

In order to ensure the control of the elasto-kinematic characteristics of the suspension, a precise control of the torsional stiffness about the second shear axis T2 is necessary. This is achieved by virtue of the second connection between the transverse arm 18 and the longitudinal arm 14 through the bush 26. The sole function of the bush 26 is to adjust (via its stiffness in a roughly vertical direction) the torsional stiffness of the shear axis T2. Since the second shear axis T2 is far less stiff in rotation than the first shear axis T1, the desired longitudinal stiffness characteristic of the suspension is encapsulated in the bush 26. Moreover, the bush 26 is subject to minimal load under the application of cornering forces, and therefore its flexibility does not compromise the necessary lateral stiffness of the suspension.

The first, torsionally stiffer shear axis T1 is defined by the pair of blades 22, 23 on the transverse arm 18 (as shown in FIG. 4), as it is geometrically constructed as the intersection between the planes of the two blades. By properly choosing the orientation of the two blades 22 and 23, it is therefore possible to obtain the desired orientation of this first shear axis T1, while the torsional stiffness of the axis is determined by the flexural stiffnesses of the two blades. Provided that the bushes 36 and 37 which connect the two blades 22 and 23 to the wheel carrier are stiff enough and the two blades have a high ratio of the in-plane bending stiffness to the normal-to-plane bending stiffness, then the suspension exhibits a high ratio of the torsional stiffness about the first shear axis T1 to the translational stiffness along this axis.

As mentioned above, the behaviour of the suspension is such that the displacement of the wheel carrier under load is defined by the superimposed rotations about the two shear axes T1 and T2. The more the camber control rod 16 is arranged approximately parallel to the second shear axis T2 and passes through the first shear axis T1, the more is this concept valid.

Having regard to the forces acting on the suspension, it is to be noticed that the longitudinal behaviour of the suspension at the wheel carrier is well decoupled from its lateral behaviour. The cornering forces do not pass through the soft bush 26 and, apart from the torsional compliance about the vertical direction (provided by the first shear axis T1) necessary to produce the desired toe-in effect under cornering forces, there are no other parasitic compliances capable of lowering the lateral stiffness at the contact patch.

The main advantages of an independent suspension according to the invention will be now illustrated.

First of all, the main advantage in relation to traditional suspension architectures consists in the relatively low cost, in particular if compared with the high elasto-kinematic performance offered, which basically originates from a reduction in the architecture complexity. Thanks to the great flexibility of configuration of the suspension enabled by the use of two shear axes, the elasto-kinematic performance of the suspension is in fact extremely high.

Since the longitudinal flexibility of the system does not depend entirely on the bush 26 which connects the longitudinal arm 14 with the transverse arm 18, a much greater longitudinal flexibility of the wheel can be obtained without thereby reducing the lateral stiffness or passive steer capability thereof. The high "efficiency" of the shear axes T1 and T2, that is the high ratio of the torsional stiffness of the suspension about each axis to the translational stiffness of the suspension in response to a force passing through this axis, makes it possible for the bush 26 to have a lower lever ratio with respect to the longitudinal movement of the wheel centre. Accordingly, the bush 26 can be stiffer and more compact and can thus be manufactured as a standard radially-acting rubber bush. Advantageously, the bush 26 can incorporate a hydraulic damper.

The high decoupling of the longitudinal loads from the lateral loads, and therefore the high decoupling of the elasto-kinematic characteristics of the suspension, makes vehicle development quicker and easier. Moreover, the unsprung mass of the vehicle is reduced with this architecture.

As far as the installation on the vehicle is concerned, the fact that the suspension uses a mounting location to the vehicle body (the bush 24 which connects the longitudinal arm 14 to the vehicle body) common to the vast majority of small-to-medium size passenger cars, which generally adopt rear suspensions having a twist-beam or longitudinal guided arms, involves minimal modifications to the vehicle structure for the installation of the suspension on existing platforms.

The proposed suspension architecture can clearly be used for driven, as well non-driven, wheels. This is due in particular to the great freedom in the positioning of the spring and the damper, enabled by the existence of two rigid lower arms (the longitudinal arm 14 and the transverse arm 18).

The simple load paths in the suspension helps its industrialisation. For instance, the longitudinal arm 14 is only subject to loads in a vertical plane passing through the bushes 24, 26 and 28 and can therefore be obtained by stamping. The transverse arm 18 can also be easily obtained by a one- or two-piece stamping. Both these components can have a blade-like shape. The camber control lateral rod can be produced with any the low-cost technologies currently used for the production of such components. All the bushes, with the exception of the bush 26 which connects the longitudinal and transverse arms, can be standard rigid bushes.

The provision of three mounting points of the wheel carrier to the suspension makes the assembly and camber/toe static set-up processes easier.

Finally, the use of short flexible blades increases the resistance to collapse under lateral abuse loads due to buckling.

Figure 8:
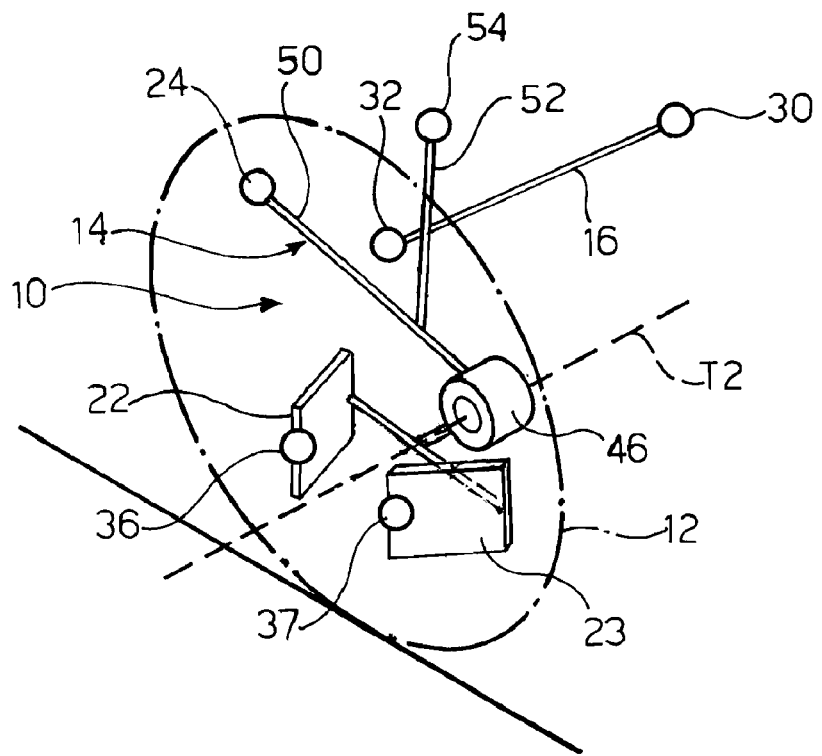

Three possible variants of embodiment of an independent suspension for a motor vehicle according to the invention, which differ from the preferred embodiment described above in the way of realisation of the second shear axis T2 (horizontal axis), are illustrated in FIGS. 6 to 8, in which parts and elements identical or corresponding to those of the preceding figures have been given the same reference numerals.

In the suspension shown in FIG. 6 the second shear axis T2 is defined by a pair of bushes 28 and 40 which connect the longitudinal arm 14 to the transverse arm 18. In this case, since the bush 34 between the transverse arm 18 and the vehicle body is no longer required to define the shear axis, its position can be chosen freely. Therefore, the bush 34 does not have to be aligned with the two bushes 28 and 40, as shown in FIG. 6.

In the suspension shown in FIG. 7 the second shear axis T2 is defined by the compliance characteristics of a flexible lower arm, generally indicated 42. The lower arm 42 comprises a longitudinal branch 44 and a transverse branch 48, corresponding to the longitudinal arm 14 and to the transverse arm 18, respectively, of the suspension of FIG. 1. In the particular embodiment illustrated in FIG. 7 the two branches 44 and 48 are formed as essentially planar elements intersecting along an axis. In this case, therefore, the axis of intersection between the two essentially planar elements 44 and 48 defines the second shear axis T2 of the suspension. With such a configuration, the flexural stiffnesses of the essentially planar elements 44 and 48 can define the torsional stiffness of the suspension about the second shear axis T2.

In the suspension shown in FIG. 8 the second shear axis T2 is defined by a single bush 46 (or by more than one bush, according to a further non-illustrated variant of embodiment), which is mounted at the end of the longitudinal arm 14 and supports the two blades 22 and 23 which define the first shear axis T1. The transverse arm is here omitted and the longitudinal arm 14 has a first longitudinal branch 50 and a second oblique branch 52 articulated to the vehicle body by means of respective bushes 24 and 54.

Figure 9:
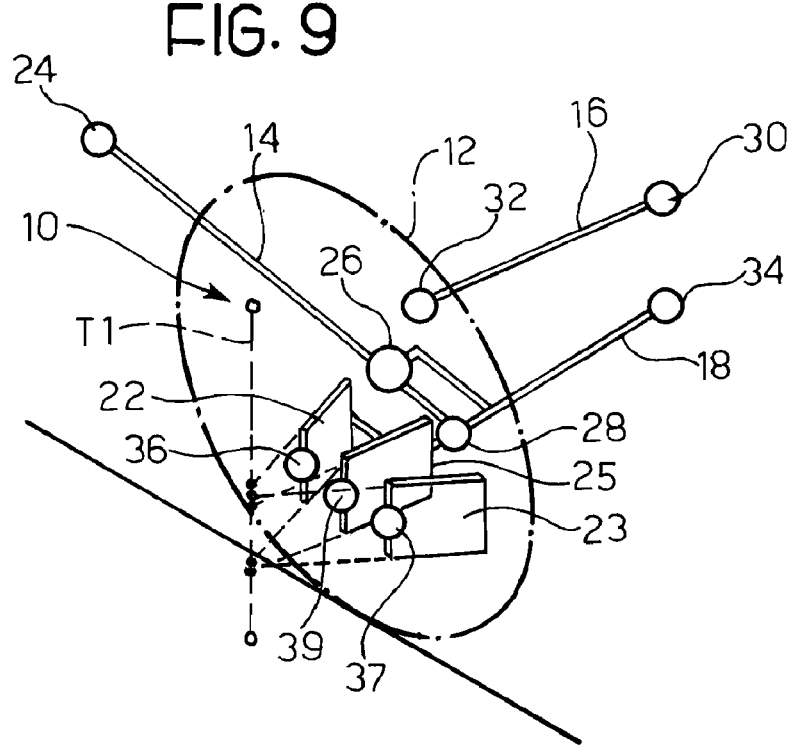
FIG. 9 is a schematic illustration of a variant of embodiment of an independent suspension for a motor vehicle according to the invention which differs from the embodiment of FIG. 1 in the way of realisation of the first shear axis.
Figure 15:
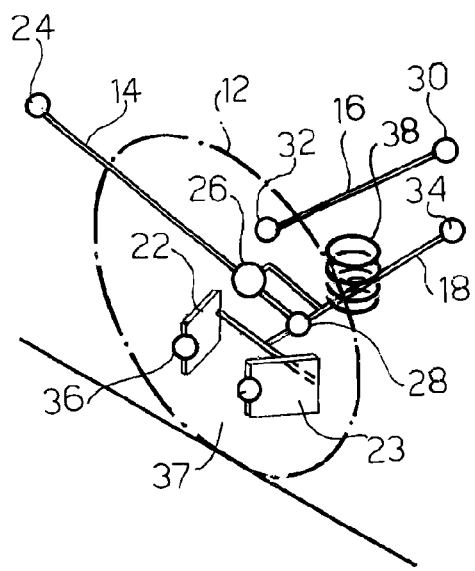
FIGS. 15 and 16 are schematic illustrations each showing a possible arrangement of the spring in the suspension according to the embodiment of FIG. 1.
Figure 16:
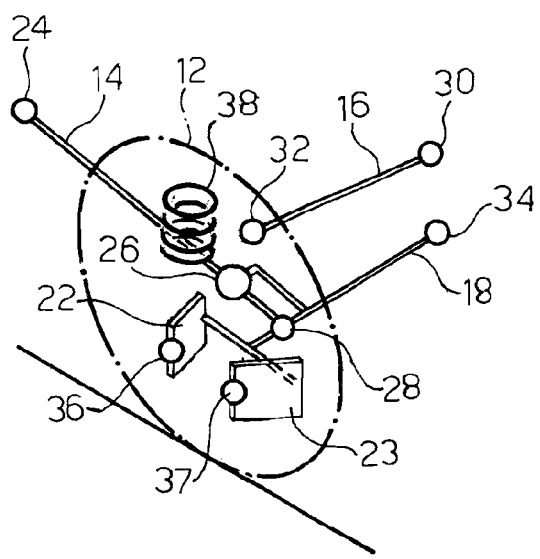

Another possible variant of embodiment of an independent suspension for a motor vehicle according to the invention, which differs from the preferred embodiment previously described in the way of realisation of the first shear axis T1, is illustrated in FIG. 9, in which parts and elements identical or corresponding to those of the preceding figures have been given the same reference numerals.

According to this variant of embodiment, a third blade 25 is provided which is arranged in a plane passing through the first shear axis T1 so as to act in parallel with the first two blades 22 and 23 and is connected to the wheel carrier by means of a bush 39. Clearly, it is also possible to provide a greater number of blades. It is also clear that this variant of embodiment can be combined with any one of the three variants of embodiment illustrated in FIGS. 6 to 8.

FIGS. 10 to 14 show further variants of embodiment of an independent suspension for a motor vehicle according to the invention, which differ from the embodiment of FIG. 1 in the further links than those defining the two shear axes of the suspension. In these figures, elements identical or corresponding to those of the suspension of FIG. 1 are indicated by the same reference numerals.

In the variant of embodiment of FIG. 10 a transverse wishbone 58, articulated to the vehicle body by means of a pair of bushes 30 and to the wheel carrier of the wheel 12 by means of a bush 32, is provided instead of the transverse rod 16. In the variant of embodiment of FIG. 11 a first rod 60, articulated by means of bushes 30 and 32 to the vehicle body and to the wheel carrier of the wheel 12, respectively, and a second rod 62, articulated to the vehicle body by means of a bush 30 and connected to the first rod 60 by means of a bush 61, are provided. The use of a transverse wishbone or of two rods connected to each other makes provides an additional control of the longitudinal compliance of the suspension, which predominantly affects the rotation about the second shear axis T2 for a longitudinal force though having also an effect on the rotation about the first shear axis T1.

The two variants of embodiment illustrated in FIG. 12 and in FIG. 13 provides for the use of links which also control torsional degrees of freedom in addition to the usual translational degree of freedom. In the example of FIG. 12 a link 64 is used which is articulated at its ends by means of universal joints 63 and 65 to the vehicle body and to the wheel carrier of the wheel 12, respectively, and is capable of providing a further torsional constraint about its own axis, thus contributing to the rotational stiffness of the suspension about the second shear axis T2 without however having any effect on the first shear axis T1. In the example of FIG. 13 a link 66 such as the one described in the International Patent Application PCT/IB2004/001196 in the name of the Applicant is used, which is articulated at its ends by means of bushes 67 and 69 to the vehicle body and to the wheel carrier of the wheel 12, respectively. The link 66 also contributes to the rotational stiffness of the suspension about the transverse axis and about the vertical axis, besides constraining the translational degree of freedom along its own axis.

The variant of embodiment illustrated in FIG. 14 differs from the embodiment of FIG. 1 in the addition, next to the camber control rod 16, of a toe-control lateral rod 68 which is articulated at its ends by means of bushes 71 and 73 to the vehicle body and to the wheel carrier of the wheel 12, respectively, and serves to correct the toe-out tendency of the suspension during the bump/rebound motion of the wheel in order to obtain an anti-lift effect. This toe-change effect due to the addition of the lateral rod 68 takes place about the first shear axis T1 defined by the blades 22 and 23. These blades have therefore to be flexible enough to absorb the deflection caused by the above effect without incurring excessive bending stresses.

Figure 17:
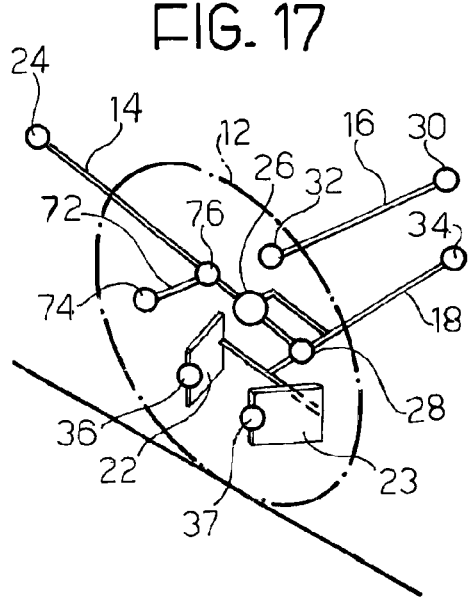
FIGS. 17 and 18 are schematic illustrations each showing a further variant of embodiment of an independent suspension for a motor vehicle according to the invention.
Figure 18:
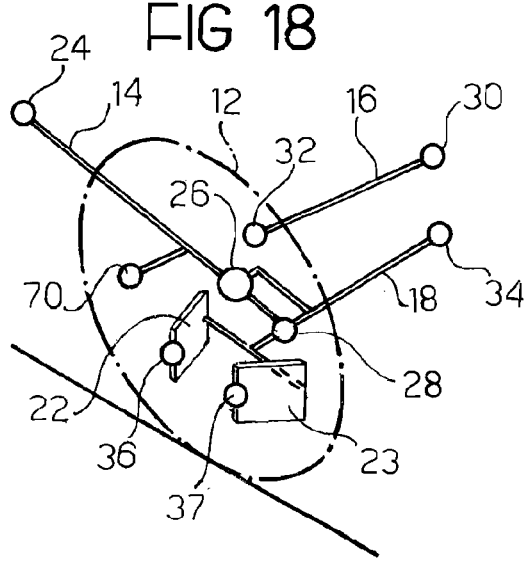

In the suspension of the invention there are no limitations on the placing of a spring and a damper, which can be attached, either separately or as part of a spring and damper unit, to any of the links of the suspension or directly to the wheel carrier. Particularly advantageous is the mounting of the spring (indicated 38) directly onto either one of the lower arms, that is to say onto the transverse arm 18 (as shown in FIG. 17) or onto the longitudinal arm 14 (as shown in FIG. 18). The damper can also be mounted onto any of the components of the suspension, although it is preferable to mount it directly onto the wheel carrier so as to improve the damping control and reduce the stresses on the component during operation.

The different ways in which the rotational stiffnesses of the suspension about the two shear axes can be controlled are listed below.

The rotational stiffness about the first shear axis T1 can be controlled by means of:

a) the flexural stiffnesses of the flexible blades (the two blades 22 and 23 in the embodiments of FIG. 1 and FIGS. 6 to 8 and the three blades 22, 23 and 25 in the embodiment of FIG. 9); or b) an additional connection of the wheel carrier to one of the two lower arms (the longitudinal arm 14 in the variants of embodiment illustrated in FIGS. 17 and 18), obtained either directly with a bush 70 (FIG. 17) or with a proper link 72 (FIG. 18) articulated at an end to the wheel carrier by means of a bush 74 and at the opposite end to the longitudinal arm 14 by means of a bush 76.

The rotational stiffness about the second shear axis T2 can be controlled by means of:

a) an additional bush between the longitudinal arm 14 and the transverse arm 18, such as for example the bush 26 of the embodiment of FIG. 1;

b) the torsional stiffness of the bushes which define the second shear axis T2, that is to say the bushes 28 and 34 in the embodiment of FIG. 1, the bushes 28 and 40 in the embodiment of FIG. 6 and the bush 46 in the embodiment of FIG. 8;

c) a longitudinal constraint applied to the wheel carrier, such as for example the one provided by the transverse wishbone 58 in the embodiment of FIG. 12 or by the two interconnected rods 60 and 62 in the embodiment of FIG. 11; or d) the flexural stiffness of the flexible lower arm 42 in the embodiment of FIG. 7.

Naturally, the principle of the invention remaining unchanged, embodiments and manufacturing details can be varied widely from those described and illustrated purely by way of non-limiting example.

The invention claimed is:

1. Motor-vehicle independent suspension for connecting a wheel carrier of a vehicle wheel to a vehicle body, the suspension comprising at least one lower arm connected to the vehicle body and at least one upper link connected to the vehicle body, wherein said at least one lower arm carries at least two substantially blade-like flexible members which are connected to the wheel carrier of the wheel and the planes of which intersect along one common axis of predetermined orientation defining a first shear axis of the suspension;

wherein said at least one lower arm is connected to the vehicle body by a pair of a first bush and a second bush;

wherein said at least one lower arm is configured to define a second shear axis of predetermined orientation acting in series with the first shear axis, in such a manner that when the wheel carrier is subject to an external force acting in a substantially horizontal plane the displacement of the wheel carrier results from the combination of the rotations of the wheel carrier about the two shear axes; and wherein said at least one lower arm includes a longitudinal arm connected to the vehicle body by the first bush.

2. Suspension according to claim 1, wherein the two shear axes are arranged substantially in a transverse vertical plane.

3. Suspension according to claim 2, wherein the first shear axis extends substantially vertically outside the vehicle and the second shear axis extends substantially horizontally at a height comprised between the ground and the centre of the wheel.

4. Suspension according to claim 3, having a higher torsional stiffness about the first shear axis than the torsional stiffness about the second shear axis.

5. Suspension according to claim 1, comprising a rigid lower longitudinal arm and a lower transverse arm to which the said at least two blade-like flexible members are connected.

6. Suspension according to claim 5, wherein the longitudinal arm is articulated to the transverse arm by a third soft bush arranged in an intermediate portion of the longitudinal arm and by a fourth rigid bush arranged at an end of this arm, and wherein the transverse arm is also articulated to the vehicle body by said second bush made as a rigid bush, in such a manner that the second shear axis corresponds to the axis passing through the second and fourth bushes.

7. Suspension according to claim 5, wherein the longitudinal arm is articulated to the transverse arm by a pair of rigid bushes, in such a manner that the axis passing through said pair of bushes corresponds to the second shear axis.

8. Suspension according to claim 1, comprising a single lower arm including a flexible longitudinal branch and a flexible transverse branch formed as essentially planar elements which intersect along an axis, in such a manner that the second shear axis of the suspension corresponds to the axis of intersection between the said essentially planar elements.

9. Suspension according to claim 1, comprising
a single lower arm having a first longitudinal branch and a second oblique branch articulated to the vehicle body by said first and second bushes, respectively, and
at least one bush which is mounted onto the lower arm and supports said at least two blade-like flexible members.

10. Suspension according to claim 1, wherein said at least one upper link is a camber control lateral rod articulated to the vehicle body and to the wheel carrier of the wheel by respective bushes.

11. Suspension according to claim 10, wherein the lateral rod is approximately parallel to the second shear axis and passes through the first shear axis.

12. Suspension according to claim 1, wherein said at least one upper link is a transverse wishbone, which is articulated to the vehicle body by a pair of bushes and to the wheel carrier of the wheel by a single bush.

13. Suspension according to claim 1, wherein said at least one upper link comprises a first rod which is articulated by bushes to the vehicle body and to the wheel carrier of the wheel, respectively, and a second rod which is articulated to the vehicle body by a bush and is connected to the first rod by a bush.

14. Suspension according to claim 1, wherein said at least one upper link is a rod which is articulated by bushes to the vehicle body and to the wheel carrier of the wheel, respectively, and is capable of controlling both a translational degree of freedom along its own axis and at least one rotational degree of freedom.

15. Suspension according to claim 10, wherein said at least one upper link further comprises a toe-control lateral rod, which is articulated by bushes to the vehicle body and to the wheel carrier of the wheel, respectively.

16. Suspension according to claim 1, further comprising a spring mounted onto said at least one lower arm.

17. Suspension according to claim 1, wherein said at least one lower arm is connected to the wheel carrier either directly with a bush or with a link articulated at its ends to the lower arm and to the wheel carrier.

18. Suspension according to claim 1, wherein said at least two blade-like flexible members are articulated at their transversely outer ends to the wheel carrier of the wheel by respective bushes and are attached at their transversely inner ends to said at least one lower arm.

19. Suspension according to claim 1, comprising two blade-like flexible members, of which the one is articulated at its transversely outer end to the wheel carrier of the wheel by a bush and is attached at its transversely inner end to said at least one lower arm, and the other is attached at its transversely outer end to the wheel carrier of the wheel and is articulated at its transversely inner end to said at least one lower arm by a bush.

* * * * *